US012361341B1

(12) United States Patent
Stephen et al.

(10) Patent No.: US 12,361,341 B1
(45) Date of Patent: Jul. 15, 2025

(54) AUTOMATIC SERVICE APPOINTMENT SUGGESTION AND BOOKING THROUGH A DISPENSER

(71) Applicant: Wayne Fueling Systems LLC, Austin, TX (US)

(72) Inventors: Aneesh Maria Stephen, Tamil Nadu (IN); Anil Kumar Peddireddy, Plainsfield, IL (US)

(73) Assignee: Wayne Fueling Systems LLC, Austin, TX (US)

( * ) Notice: Subject to any disclaimer, the term of this patent is extended or adjusted under 35 U.S.C. 154(b) by 0 days.

(21) Appl. No.: 18/651,628

(22) Filed: Apr. 30, 2024

(51) Int. Cl.
*G06Q 10/02* (2012.01)
*G06Q 10/1093* (2023.01)

(52) U.S. Cl.
CPC ......... *G06Q 10/02* (2013.01); *G06Q 10/1095* (2013.01)

(58) Field of Classification Search
CPC .......................... G06Q 10/1095; G06Q 10/02
USPC ........................................................... 705/5
See application file for complete search history.

(56) References Cited

U.S. PATENT DOCUMENTS

| 10,577,237 | B2 | 3/2020 | Fieglein | |
|---|---|---|---|---|
| 2007/0144605 | A1* | 6/2007 | Horowitz | G06Q 50/40 |
| | | | | 141/83 |
| 2015/0142256 | A1* | 5/2015 | Jones | G06Q 10/06 |
| | | | | 701/31.4 |
| 2016/0142995 | A1* | 5/2016 | Shuster | G06Q 30/02 |
| | | | | 455/456.1 |
| 2016/0307247 | A1* | 10/2016 | Sells | G06Q 30/0611 |

(Continued)

FOREIGN PATENT DOCUMENTS

| CN | 108269177 A | 7/2018 | |
|---|---|---|---|
| JP | H0896041 A | 4/1996 | |
| WO | WO-2024073160 A1 * | 4/2024 | ............. B67D 7/145 |

OTHER PUBLICATIONS

D. R. Bolla, J. J. J, S. S. Palle, M. Penna, Keshavamurthy and Shivashankar, "An IoT Based Smart E-Fuel Stations Using ESP-32," 2020 International Conference on Recent Trends on Electronics, Information, Communication & Technology (RTEICT), Bangalore, India, Nov. 2020, pp. 333-336. (Year: 2020).*

(Continued)

*Primary Examiner* — Jeff Zimmerman
*Assistant Examiner* — Hunter Molnar
(74) *Attorney, Agent, or Firm* — Mintz, Levin, Cohn, Ferris, Glovsky and Popeo, P.C. US

(57) ABSTRACT

Various exemplary devices, systems, and methods for automatic service appointment suggestion and booking through a dispenser are provided. In general, a dispenser within a dispensing environment is configured to identify information of a vehicle present within the dispensing environment based on image or video data of a portion of the vehicle captured by an image sensor within the dispensing environment. In an exemplary implementation, the dispenser is further configured to obtain service history information of the vehicle from a remote entity using the identifying information of the vehicle and display current service information and one or more first interactive graphics for booking a vehicle service appointment based on the service history information. In response to receiving a booking confirmation, the dispenser is configured to cause a vehicle service appointment to be booked with a vehicle service station.

17 Claims, 11 Drawing Sheets

(56) References Cited

U.S. PATENT DOCUMENTS

| | | |
|---|---|---|
| 2017/0178257 A1 | 6/2017 | Tingler et al. |
| 2017/0180012 A1* | 6/2017 | Tingler .................. H04B 5/77 |
| 2017/0190226 A1* | 7/2017 | Parker ............... G06Q 30/0633 |
| 2019/0172001 A1* | 6/2019 | Painter .................. G06N 20/00 |
| 2020/0226390 A1* | 7/2020 | Armon .................. G06V 20/54 |
| 2024/0166492 A1* | 5/2024 | Thobe ..................... B67D 7/04 |

OTHER PUBLICATIONS

International Search Report and Written Opinion received for PCT Patent Application No. PCT/US2024/027106, mailed on Aug. 26, 2024, 13 pages.

* cited by examiner

AUTOMATIC SERVICE APPOINTMENT SUGGESTION AND BOOKING THROUGH A DISPENSER

FIELD

Methods and systems for automatic service appointment suggestion and booking through a dispenser are provided.

BACKGROUND

Dispensing environments can provide fuel, electricity, gas, or similar consumable products or energy-generating materials to vehicles via product dispensers. Vehicle operators can enter the dispensing environment to purchase fuel, gas, and/or electricity from one of several product dispensers for their vehicle. Often, dispensing environments offer other items or services for purchase, such as food, drinks, vehicle maintenance equipment, vacuum, air, repair services, or car washes.

Meanwhile, several vehicles that enter such dispensing environments are in need of maintenance. It is well-known that many operators fail to track the maintenance or service due dates of their vehicle, resulting in vehicles with components that are prone to breakdown. Vehicle repair costs can be significant-recent studies have shown the economic impact of vehicle breakdowns in the U.S. to be in the tens of billions of dollars, annually-yet are typically preventable, or at least mitigated, by performing regularly scheduled maintenance. Oftentimes the required maintenance depends on a vehicle's service history, but a record of such history is seldom readily available to the vehicle operator. Moreover, scheduling a service appointment can be a tedious task as it requires knowledge of local maintenance centers and their availability for appointments. And from the perspective of the maintenance center, it can be challenging to effectively advertise its availability to vehicle operators, resulting in loss of business when a repair center is lesser known.

SUMMARY

In general, devices, systems, and methods for automatic service appointment suggestion and booking through a dispenser are provided.

In one aspect, a method is provided that in one implementation includes determining, by a data processor of a dispenser within a dispensing environment, identifying information of a vehicle present within the dispensing environment based on image or video data of a portion of the vehicle captured by an image sensor within the dispensing environment, the image sensor being communicatively coupled to the dispenser. Service history information of the vehicle can be obtained, via a first communication link between the dispenser and a remote entity, from the remote entity using the identifying information of the vehicle. A display screen of the dispenser can display, based on the service history information of the vehicle, current service information and one or more first interactive graphics for booking a vehicle service appointment, the display screen being configured to receive user input via the one or more first interactive graphics. Then, the dispenser can cause, via a second communication link between the dispenser and a vehicle service station, the vehicle service appointment to be booked with the vehicle service station in response to receiving a booking confirmation via the one or more first interactive graphics.

The method can vary in any number of ways. For example, the current service information displayed by the display of the dispenser can include one or more of: a due date for a next service appointment, a date of a previous service appointment, a current condition of the vehicle or one or more components of thereof, and a notification that service is needed.

For another example, the method can further include determining, by the data processor of the dispenser, whether the vehicle service appointment is required based on the service history information of the vehicle. In such case, the one or more first interactive graphics for booking the vehicle service appointment can be displayed only if the data processor of the dispenser determines that the vehicle service appointment is required.

For yet another example, the identifying information of the vehicle can include one or more of: a license plate number, a vehicle identification number (VIN), and a make and model of the vehicle.

For still another example, the portion of the vehicle in the image or video data captured by the image sensor can include a license plate of the vehicle or a unique graphical element located on the vehicle.

For yet another example, the method can further include sending, by the dispenser and via the first communication link, one or more application programming interface (API) requests to the remote entity for the service history information of the vehicle using the identifying information of the vehicle, and receiving, by the dispenser and via the first communication link, the service history information of the vehicle in response to the one or more API requests.

For another example, the remote entity can be a vehicle service provider server managed by a vehicle service provider associated with the vehicle, the vehicle service provider server being configured to store the service history information of the vehicle, and the one or more API requests can be sent directly from the dispenser to the vehicle service provider server.

For still another example, the remote entity can be a centralized server in communication with a plurality of service provider servers, the centralized server being configured to store service history information for a plurality of vehicles received from the plurality of service provider servers and to provide access to the stored service history information to the dispenser.

For another example, the method can further include performing, by the data processor of the dispenser, an image or video processing algorithm on the image or video data of the portion of the vehicle to generate the identifying information of the vehicle. In this regard, the portion of the vehicle in the image or video data captured by the image sensor can be a license plate of the vehicle, the identifying information of the vehicle can include a license plate number, and the image or video processing algorithm is configured to recognize the license plate number. Alternatively, the portion of the vehicle in the image or video data captured by the image sensor can include a unique graphical element located on the vehicle, the identifying information of the vehicle can include a VIN linked to the unique graphical element, and the image or video processing algorithm is configured to recognize the unique graphical element.

For still another example, the method can further include receiving, by the dispenser, the identifying information of the vehicle from a remote location having generated the identifying information of the vehicle using the image or video data of the portion of the vehicle.

For yet another example, the method can further include receiving, by the data processor of the dispenser, user information from a mobile device in communication with the dispenser; and determining, by the data processor of the dispenser, the identifying information of the vehicle based on the user information, the identifying information of the vehicle being associated with the user information.

For another example, the method can further include receiving, by the data processor of the dispenser and via the one or more first interactive graphics, user-specified booking information including an indication of one or more of: a date of the vehicle service appointment, a time of the vehicle service appointment, a location of the vehicle service appointment, and a type of the vehicle service appointment; and causing, via the second communication link, the vehicle service appointment to be booked with the vehicle service station using the user-specified booking information. Additionally, the method can further include displaying, by the display of the dispenser, information regarding the booked vehicle service appointment.

For still another example, the method can further include displaying, via the display of the dispenser, an indication of one or more incentives to book the vehicle service appointment, the one or more incentives comprising an offer or a discount associated with the dispensing environment.

For yet another example, the method can further include obtaining, by the data processor of the dispenser, fueling history information of the vehicle using the identifying information of the vehicle, the fueling history information indicative of one or more characteristics from a previous fueling session including a grade of fuel, a quantity of fuel, or a pump used to deliver fuel; generating, by the data processor of the dispenser, a fueling suggestion for the vehicle based on the fueling history information; and displaying, by the display of the dispenser, an indication of the generated fueling suggestion.

For another example, the method can further include displaying, via the display of the dispenser, a second interactive graphical element which, upon activation, is configured to automatically initiate a fueling session according to the generated fueling suggestion; and initiating, by the data processor of the dispenser, the fueling session according to the generated fueling suggestion in response to activation of the second interactive graphical element.

In another aspect, a dispenser is provided that in one implementation includes one or more network interfaces configured to send and receive information via a communication link; a display screen configured to receive user input via one or more first interactive graphics; at least one data processor configured to perform one or more operations; and a memory configured to store program instructions executable by the at least one data processor. When executed the program instructions can cause the at least one data processor to perform operations including determining identifying information of a vehicle present within a dispensing environment based on image or video data of a portion of the vehicle captured by an image sensor within the dispensing environment, the image sensor being communicatively coupled to the dispenser; obtaining, via a first communication link between the dispenser and a remote entity, service history information of the vehicle from the remote entity using the identifying information of the vehicle; displaying, by the display screen and based on the service history information of the vehicle, current service information and the one or more first interactive graphics for booking a vehicle service appointment; and causing, via a second communication link between the dispenser and a vehicle service station, the vehicle service appointment to be booked with the vehicle service station in response to receiving a booking confirmation via the one or more first interactive graphics.

In yet another aspect, a system is provided that in one implementation includes an image sensor provided within a dispensing environment; and a dispenser provided within the dispensing environment and communicatively coupled to the image sensor, the dispenser comprising one or more network interfaces configured to send and receive information via a communication link, a display screen configured to receive user input via one or more first interactive graphics, at least one data processor configured to perform one or more operations, and a memory configured to store program instructions executable by the at least one data processor. In one embodiment, the image sensor is configured to capture image or video data of a portion of a vehicle present within the dispensing environment. Furthermore, the at least one data processor is configured to determine identifying information of the vehicle based on the image or video data; obtain, via a first communication link between the dispenser and a remote entity, service history information of the vehicle from the remote entity using the identifying information of the vehicle; display, by the display screen and based on the service history information of the vehicle, current service information and the one or more first interactive graphics for booking a vehicle service appointment; and cause, via a second communication link between the dispenser and a vehicle service station, the vehicle service appointment to be booked with the vehicle service station in response to receiving a booking confirmation via the one or more first interactive graphics.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DETAILED DESCRIPTION

Figure 1A:
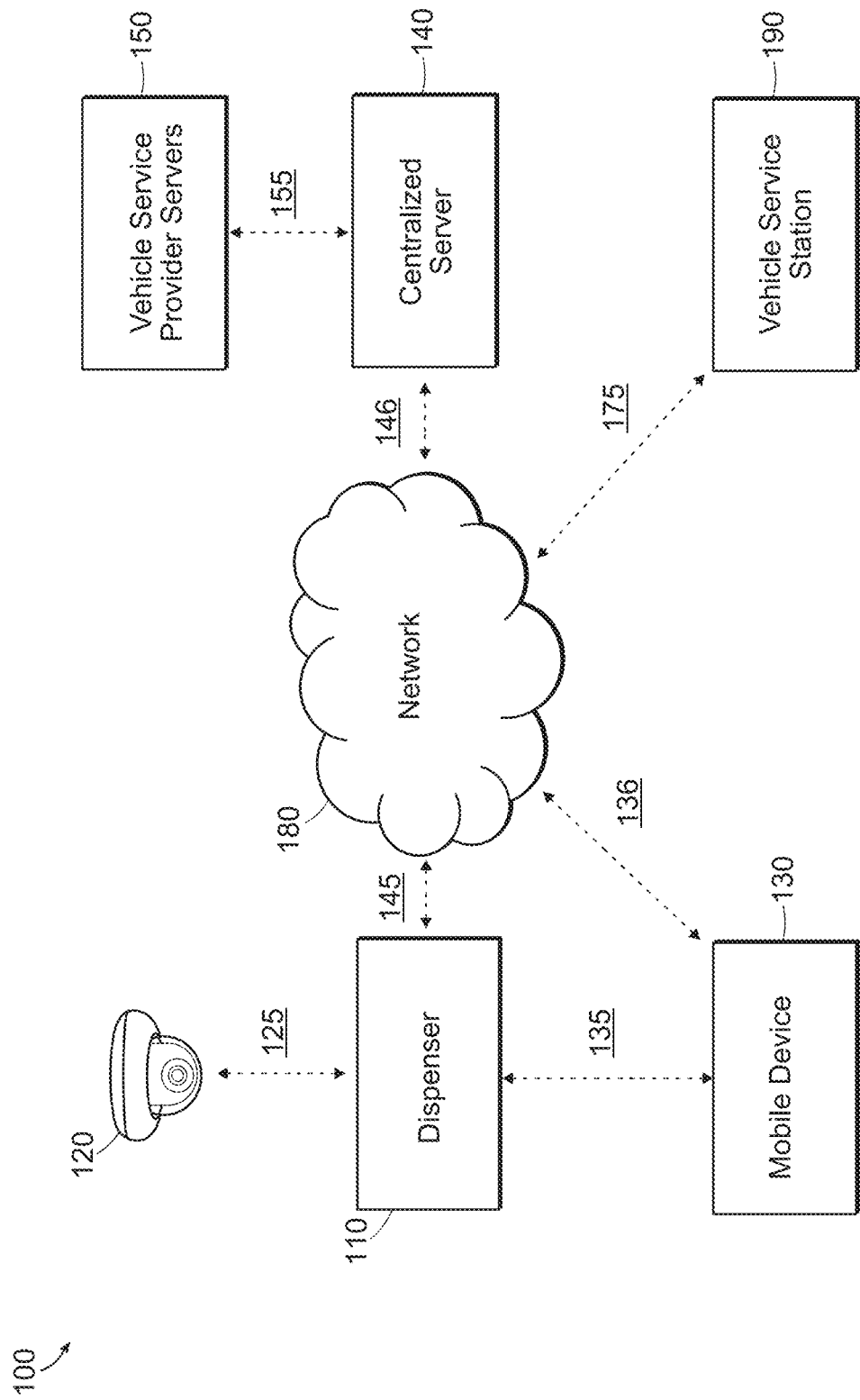
FIG. 1A is a schematic view of a first implementation of a system for automatic service appointment suggestion and booking through a dispenser.

Certain exemplary embodiments will now be described to provide an overall understanding of the principles of the structure, function, manufacture, and use of the devices, systems, and methods disclosed herein. One or more examples of these embodiments are illustrated in the accompanying drawings.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the dimensions of the subject in which the systems and devices will be used, the size and shape of components with which the systems and devices will be used, and the methods with which the systems and devices will be used.

Various exemplary devices, systems, and methods for automatic service appointment suggestion and booking through a dispenser are provided. In general, dispensing environments can provide fuel, electricity, gas, or similar consumable products or energy-generating materials to vehicles via product dispensers, which may be referred to herein as "dispensers" for simplicity. Vehicle operators can enter the dispensing environment to purchase fuel, gas, and/or electricity from one of several dispensers for their vehicle. Often, dispensing environments offer other items or services for purchase, such as food, drinks, vehicle maintenance equipment, vacuum, air, repair services, or car washes.

Meanwhile, several vehicles that enter such dispensing environments are in need of maintenance. It is well-known that many operators fail to track the maintenance or service due dates of their vehicle, resulting in vehicles with components that are prone to breakdown. Vehicle repair costs can be significant—recent studies have shown the economic impact of vehicle breakdowns in the U.S. to be in the tens of billions of dollars, annually—yet are typically preventable, or at least mitigated, by performing regularly scheduled maintenance. Oftentimes the required maintenance depends on a vehicle's service history, but a record of such history is seldom readily available to the vehicle operator. Moreover, scheduling a service appointment can be a tedious task as it requires knowledge of local maintenance centers and their availability for appointments. And from the perspective of the maintenance center, it can be challenging to effectively advertise its availability to vehicle operators, resulting in loss of business when a repair center is lesser known.

In an exemplary embodiment, a dispensing environment can be configured to ascertain the identity of a vehicle entering the environment (e.g., by a camera, a barcode scanner, based on login information, etc.). For instance, a camera located within the dispensing environment can acquire an image of the license plate of a vehicle, which can in turn be used to obtain service history details of the vehicle. The identifying information is delivered to a dispenser in the dispensing environment that is being used by the user of the vehicle. The service history can then be fetched by the dispenser in various ways, as described below, such as via communication with a centralized server which collects and stores vehicle service history information from different vehicle service provider servers, or via communication with the vehicle service provider servers directly.

Upon receipt of the vehicle service history information, the dispenser can determine various information such as the current health of the vehicle, maintenance requirements, a service due date, and so on. The dispenser can also prompt the user to book a service appointment through the dispenser itself. When the user selects to book the service appointment, the dispenser can provide the user with the details of different service stations based on preferences such as location, available time slots, etc. for booking the appointment. In further embodiments, the dispenser can incentivize the user to book the service appointment with offers or discounts for purchases within the dispensing environment, thereby increasing use of the dispenser and gas station sales, as well as revenues for service stations.

Figure 1B:
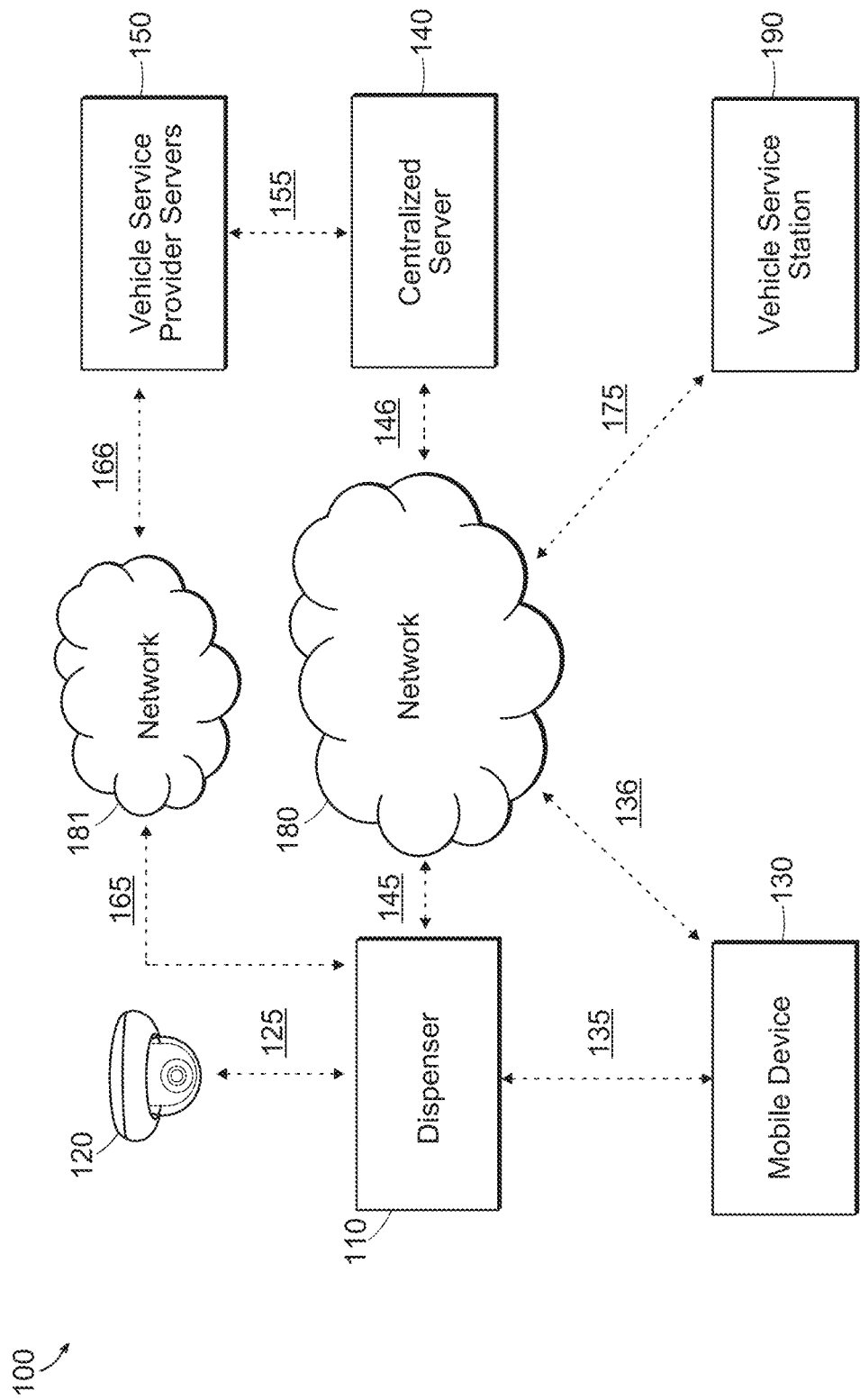
FIG. 1B is a schematic view of a second implementation of a system for automatic service appointment suggestion and booking through a dispenser.

FIGS. 1A and 1B illustrate embodiments of a system 100 for automatic service appointment suggestion and booking through a dispenser. In the description that follows, it is noted that the dispenser (or "product dispenser") includes, for example, fuel dispensers configured to dispense any type of fuel (e.g., petroleum-based fuels (gasoline), natural gas, ethanol, butanol, methanol, hydrogen fuel, electrical fuel (electricity), synthetic fuels, etc.), or alternatively, non-fuels such as goods and services, or a combination of both. The dispenser is described primarily with reference to the dispenser 110 for illustration purposes, although the dispenser as claimed is not limited thereto.

As shown in FIGS. 1A and 1B, the system 100 can include a dispenser 110, an image sensor 120, a mobile device 130, a centralized server 140, and vehicle service provider servers 150. Each of these components can be in communication with at least one other component via various communication links, which will be described in further detail below. Furthermore, the system 100 is configured in an identical manner as shown in FIGS. 1A and 1B, the distinction being the utilization of communication link 155 between the centralized server 140 and the vehicle service provider servers 150 in FIG. 1A, and the utilization of communication link 165 between the dispenser 110 and the vehicle service provider servers 150 in FIG. 1B. This distinction will be described in further detail below.

Figure 2B:
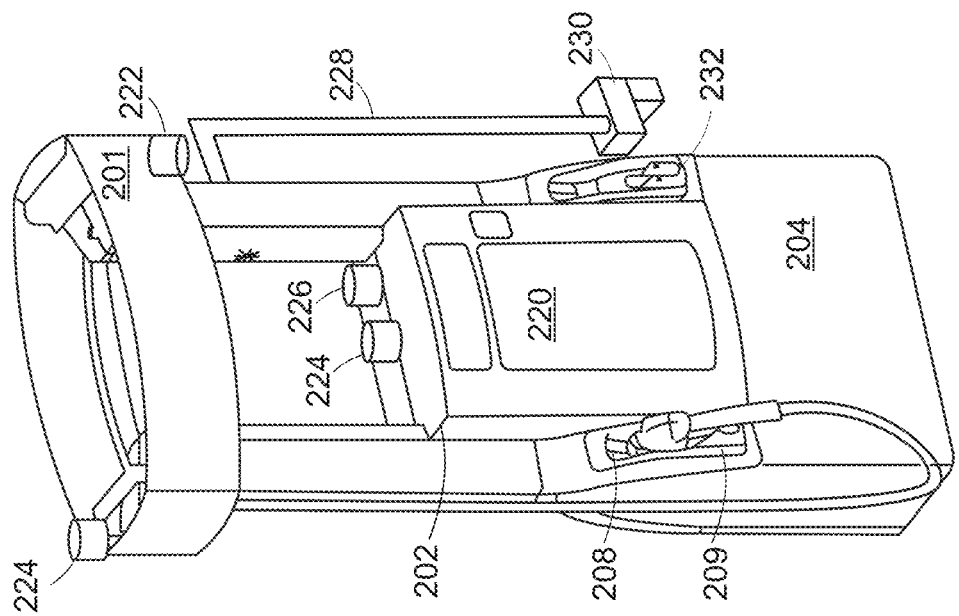
FIG. 2B is a perspective view of one implementation of the dispenser of FIGS. 1A and 1B.
Figure 2A:
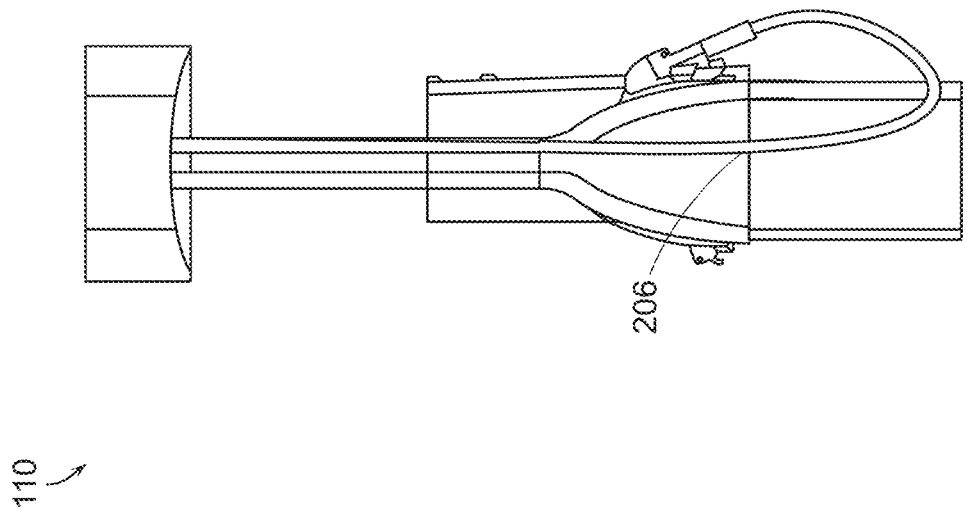
FIG. 2A is a side view of one implementation of the dispenser of FIGS. 1A and 1B.
Figure 3:
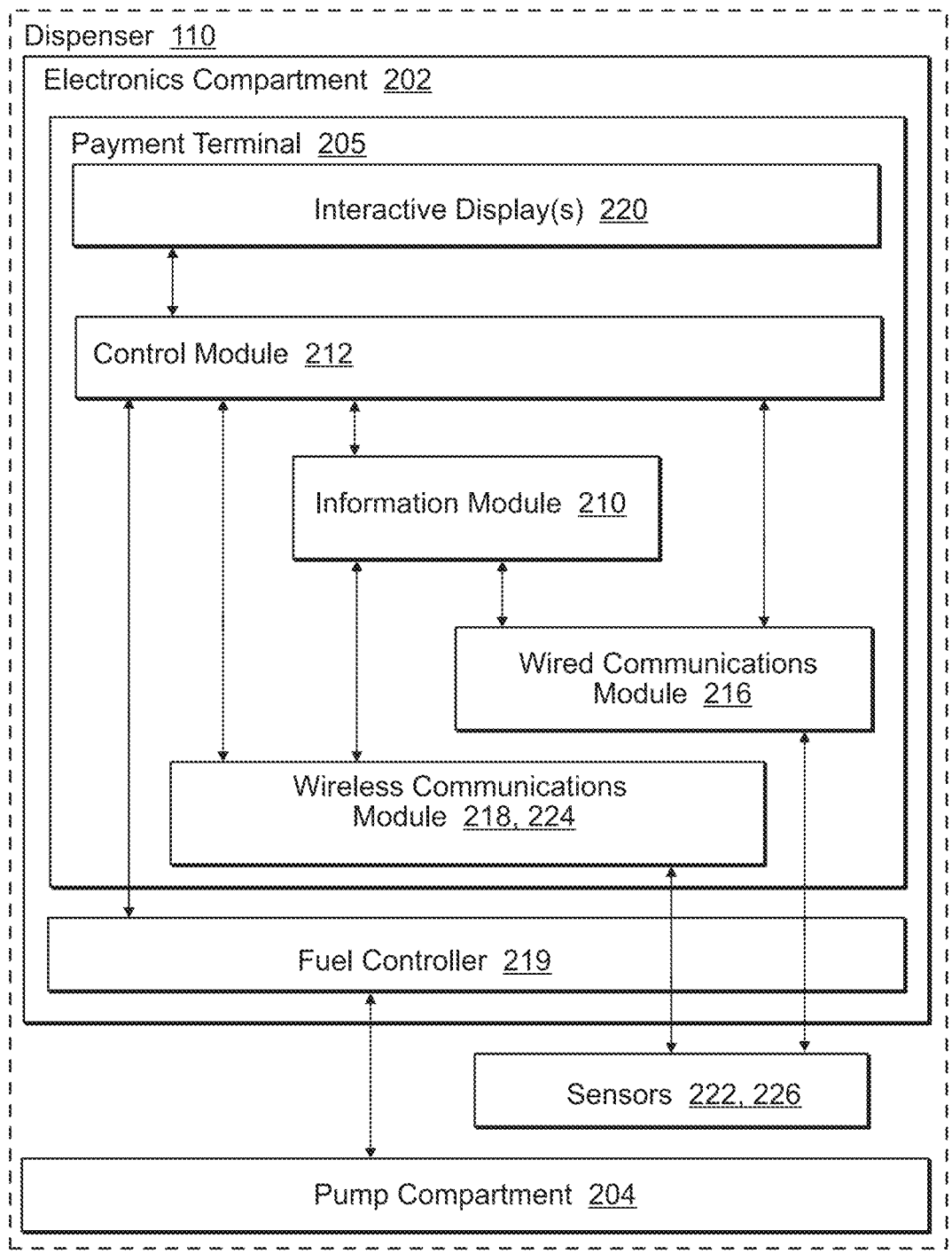
FIG. 3 is a schematic view of one implementation of the dispenser of FIGS. 1A and 1B.

Firstly, the dispenser 110 can have a variety of configurations. In general, the dispenser 110 is configured to dispense any type of fuel (e.g., liquid petroleum fuel, electricity, etc.) to a vehicle, a fuel container, or other appropriate receptacle. FIG. 2A is a side view of one implementation of the dispenser 110, and FIG. 2B is a perspective view of one implementation of the dispenser 110. Furthermore, FIG. 3 is a schematic view of one implementation of the dispenser 110, illustrating components thereof.

As shown, dispenser 110 can include a dispenser body 201 having an electronics compartment 202, a pump compartment 204, and an image sensor 222. The pump compartment 204 can house a pump configured to pump fuel from a fuel tank or other reservoir, as well as one or more meters that can be configured to monitor fuel flow, flow of fuel additives, and/or flow of other components of the fuel. The pump compartment 204 can also include other components to facilitate fuel dispensing and mixing, such as motors and valves, a strainer/filtering system, a vapor recovery system, and the like. The pump compartment 204 is isolated from the electronics compartment 202 within the dispenser 200 to facilitate safety, security, and/or maintenance, as will be appreciated by a person skilled in the art. Fuel is thus not allowed to flow from the pump compartment 204 to the electronics compartment 202 and instead flows from the pump compartment 204 through hose 206 to a nozzle 208 for dispensing. As will be appreciated by a person skilled in the art, the nozzles 208 can each be configured to dispense fuel from the dispenser 200 as pumped therefrom by the pump. The dispenser 200 can also include a nozzle receptacle 209 configured to store the nozzle 208 when not in use.

In some implementations, the dispenser 200 can include one or more components configured to send and/or receive data. For example, dispenser 200 can include a wireless transceiver 224 positioned on the electronics compartment 202 or elsewhere on the dispenser 200, such as on the dispenser body 201. The wireless transceiver 224 can be communicably coupled to the wireless communications module 218. In some embodiments, the wireless transceiver 224 can be a Bluetooth wireless transceiver configured to exchange data with a computing device via short-range radio signals. In some embodiments, one or more sensors 226 can be coupled to the dispenser 200. For example, one or more sensors 226 can include image sensors configured to acquire image data associated with the vehicle or the operator of the vehicle at the dispenser 200.

In some implementations, the dispenser 200 can be configured to dispense electricity and can include several components for dispensing the electricity. For example, dispenser 200 can be configured as an electric vehicle charger. In such embodiments, the dispenser 200 can include a charging cable 228 coupled to the dispenser body 201 at one end and configured to deliver electricity to a charging connector 230 coupled to an opposite end. The charging connector 230 can be configured to couple to a charging port of a vehicle (not shown) and to deliver the electricity provided by the dispenser 200, via the charging cable 228, to the vehicle when coupled to the charging port. When not in use, the charging connector 230 can be stored in a charger receptacle 232 formed on the dispenser body 201.

Although the dispenser 200 is described in relation to dispensing petroleum-based fuels, some or all of the functionality discussed herein can be used to adaptively determine and provide graphical communications for presentation on an alternative dispenser. For example, in some embodiments, the dispenser 200 can include a hydrogen dispenser, a liquefied petroleum gas (LPG) dispenser, a compressed natural gas (CNG) dispenser, or the like.

The electronics compartment 202 can house electronics for facilitating payment for fuel, controlling operation of the dispenser to facilitate dispensing of fuel, and for providing graphical communications and receiving inputs from a vehicle operator selecting graphics included in the graphical communication. For example, the electronics compartment 202 can include a fuel controller 219 that, at least in some implementations, includes a data processor, memory, and storage forming part of at least one computing system. The fuel controller 219 is configured to control dispensing of the fuel from the pump compartment 204. The electronics compartment 202 can also include a payment terminal 205 that is configured to provide a user with one or more options to create a desired fuel mixture, receive instructions characterizing the desired fuel mixture, receive payment information and/or user identification information from a user, transmit and receive the payment information and/or user identification information with a POS system, and deliver fueling instructions to the fuel controller 219 to dispense fuel. The payment terminal 205 can also be configured to provide a user with information related to a status of fueling. For example, the payment terminal can display an amount of fuel that has been dispensed, and a corresponding fuel cost as the fuel mixture is dispensed.

The payment terminal 205 can be configured to facilitate communication between a user and the fuel controller 219 and can include an interactive display 220 and an information module 210. The information module 210 can, at least in some implementations include a data processor, memory, and storage, forming part of at least one computing system. The payment terminal 205 can also include one or more wired communication modules 216 and/or wireless communication modules 218 and a control module 212 that, at least in some implementations includes a data processor, memory, and storage, forming part of at least one computing system. The communication modules 216, 218 can include one or more network interfaces which function to allow data to be transmitted to and from various components within the payment terminal 205 via wired and/or wireless communication, respectively. For example, the communication modules 216, 218 can be configured to transmit and receive signals that can characterize, e.g., payment information, vehicle operator identification information, vehicle attribute data, loyalty program data, and/or information regarding a desired fuel selection, via wired and/or wireless communications, respectively. The wireless communication module 218 can include, e.g., a transceiver for communicating via Bluetooth protocol (e.g., wireless transceiver 224), cellular protocol, WI-FI protocol, near field communication (NFC), and/or a radio frequency identification (RFID) protocol. Wired and/or wireless communication via the communication modules 216, 218 can be according to any of a variety of communication protocols, e.g., TCP/IP, etc., as will be appreciated by a person skilled in the art. The communication modules 216, 218 are also in operable communication with the image sensors 222, 226 and are configured to receive image data acquired by the image sensors 222, 226. The communication modules 216, 218 can additionally transmit the received image data for further external processing as described elsewhere herein.

In some implementations, the interactive display 220 can include a touchscreen. The interactive display 220 can be operably coupled to the control module 212 which can be used to control, dynamically rearrange, and/or update a graphical communication or a graphical user interface (GUI) rendered on the display 220. The display 220 can be configured to show information (e.g., media content, fuel selection options, payment information, user or vehicle identification information, loyalty program data, or the like) in the form of one or more graphics, or graphical objects, receive input (e.g., instructions for a desired fuel mixture, user identification information, payment information, acceptance/denial of a promotion identified via the graphical communication etc.) thereon, and can deliver data characterizing the input to the control module 212 to be processed. Some examples of information that the display 220 can receive from the user are: total cost, desired fuel volume, desired fuel mixture, desired additives, an initiate fueling command, and a terminate fueling command. In some implementations, the user can provide user information, such as user preferences, contact information, etc., and/or information regarding a vehicle that will consume the fuel, such as vehicle make, model, mileage, and the like. The user can also be provided with a recommend fuel blend which they can choose to select. The control module 212 can be further configured to receive from and/or control the one or more sensors 222, 226.

To facilitate payment, the information module 210 can be configured to receive input such as, e.g., user identification information and/or payment information, and deliver the information to the control module 212. For example, the information module 210 can include a barcode and/or QR code scanner, and/or a NFC contactless card reader for receiving payment information, user identification information, vehicle information, and/or loyalty program information.

In some embodiments, the information module 210 be operably coupled to the image sensors 222, 226 for acquiring images of facial features of the user, barcode and/or QR code information (e.g., to scan a loyalty rewards card), vehicle features (e.g., vehicle make, model, color, etc.), license plate number, non-facial body features, and the like, which can be used as user identification information. As another example, the information module 210 can include a palm reader and/or fingerprint reader which can scan a palm and/or finger of the user to obtain user identification information. In some embodiments, the user identification information can be associated with a loyalty rewards identifier automatically. Accordingly, in some embodiments, a predetermined payment method, and user preferences, can be determined based on user identification information.

As shown in FIG. 3, the information module 210 can be operably coupled to the wired communication module 216 and/or the wireless communication module 218. The wired and wireless communication modules 216, 218 can allow the information module 210 to send and receive payment information and/or user identification information to and from a mobile device (e.g., mobile device 130) such as a smart phone, tablet, laptop, and the like, that is in electronic communication with the information module 210 via the wired and/or wireless communication modules 216, 218. Although the wireless communication module 218 is shown to be located within the payment terminal, the wireless communication module 218 can be located elsewhere on, within, or in the vicinity of, the dispenser 200. For example, the wireless communication module 218 can be mounted on top of the dispenser, which can facilitate retrofitting the wireless communication module 218 to existing dispensers and/or facilitate repair, upgrade, or other maintenance of the communication module 218, as described in U.S. Pat. No. 10,577,237 filed on Jun. 14, 2016 and entitled "Methods and Devices for Fuel Dispenser Electronic Communication," which is incorporated by reference herein.

Referring again to FIGS. 1A and 1B, the system 100 can further include an image sensor 120 located in the dispensing environment. The image sensor 120 can be configured to capture image or video data within the dispensing environment, such as image or video data of a portion of a vehicle in the dispensing environment. In some embodiments, the image or video data of the portion of the vehicle can include, for example, image or video data of a license plate of the vehicle or a unique graphical element (e.g., a barcode, a QR code, or other uniquely identifying image) located on the vehicle that can be used to determine identifying information of the vehicle, such as a license plate number, a vehicle identification number (VIN), a make and model of the vehicle, and so forth, as described in further detail below.

The image sensor 120 can be configured in various ways, and the image sensor 120 may include any number of image sensors located throughout the dispensing environment, as would be appreciated by a person of ordinary skill in the art.

The image sensor 120 can be communicatively coupled to the dispenser 110 via communication link 125 (e.g., via the wired and/or wireless communication modules 216, 218 of the dispenser 110) which can be a wired or a wireless communication link. The image sensor 120 can thus send image or video data captured by the image sensor 120 to the dispenser 110. The image sensor 120 can also be configured to send captured image or video data to a remote location (not shown) for processing, as described further below. In some implementations, the image sensor 120 can be physically separate of the dispenser 110. For example, the image sensor 120 can be attached to a structure of the dispensing environment. In other implementations, the image sensor 120 can be integral with or part of the dispenser 110 (e.g., sensors 222, 226).

In some embodiments, the system 100 can further include a mobile device 130 in communication with the dispenser 110. For example, the mobile device 130 can belong to a user of the vehicle in the dispensing environment. The mobile device 130 can be configured in various ways, as would be appreciated by a person of ordinary skill in the art. According to one embodiment, the mobile device 130 can be configured in accordance with FIG. 6 which is a diagram of an exemplary computing system in accordance with an illustrative implementation of the system 100. The mobile device 130 can be in communication via wireless communication link 136 with any number of remote entities through an external network (e.g., network 180) as would be appreciated by a person of ordinary skill in the art.

Although the mobile device 130 is not an essential component of the methods described herein, and thus can be omitted from the system 100 in some embodiments, the mobile device 130 can be utilized for communicating with the dispenser 110 (e.g., via the wired and/or wireless communication modules 216, 218 of the dispenser 110). For example, the mobile device 130 can include one or more network interfaces (e.g., network interface 625) configured to facilitate the mobile device's communication with the dispenser 110 over a first communication link 135 and with the centralized server 140 over a second communication link 136 via the network 180. The network interfaces can be configured to transmit and/or receive data using a variety of different communication protocols, e.g., Bluetooth protocol, cellular protocol, WI-FI protocol, near field communication (NFC), a radio frequency identification (RFID) protocol, etc. Any of a variety of types of wireless connectivity hardware can be used for the wireless connectivity, as will be appreciated by a person skilled in the art. The wireless communication can be according to any of a variety of communication protocols, e.g., TCP/IP, etc., as will also be appreciated by a person skilled in the art. The wireless connectivity may facilitate wireless mesh network communication, as will be appreciated by a person skilled in the art. Furthermore, a physical network interface of the communication unit 151 can also be used to implement one or more virtual network interfaces, such as for virtual private network (VPN) access, known to those skilled in the art.

In some embodiments, a user can provide user information (e.g., a user ID number, mobile device number, email address, account name, or the like) to the dispenser 110 from the mobile device 130. In one example, a user can have previously registered an account with a remote server (e.g., centralized server 140) that provides supervisory control of the dispenser 110 and/or installed an application (e.g., downloaded from the server 140, an application store, or some other source) on the mobile device 130 associated with the dispenser 110. It should be noted that specific details regarding the creation or registration of a user account are beyond the scope of the present disclosure and are generally well-known in the art. Continuing this example, once a user has an account registered at the centralized server 140, the user can proceed to login to the application on the mobile device 130, an authentication/verification procedure can be performed, and if successful, the user can provide the user information which may be linked to information about the user's vehicle. In this manner, the dispenser 110 can receive identifying information of the vehicle (e.g., make/model of the vehicle, license plate number of the vehicle, a vehicle identification number (VIN), etc.) from the mobile device 130. The user information which has been previously associated with the vehicle information can be used in addition to, or instead of, the image or video data of the vehicle captured by the image sensor 120.

The system 100 further includes a centralized server 140. The centralized server 140 can be configured in various ways, such as in accordance with the exemplary computing system of FIG. 6. In some embodiments, the centralized server 140 can be located remote of the dispenser 110, e.g., in the cloud. The dispenser 110 can be in communication with the centralized server 140 via communication links 145, 146 (e.g., via the wired and/or wireless communication modules 216, 218 of the dispenser 110), via the network 180 (e.g., the public Internet, a virtual private network (VPN), or the like). As explained above, the communication modules 216, 218 of the dispenser 110 can be configured to transmit and receive signals to/from the centralized server 140 via wired and/or wireless communications. Wired and/or wireless communication via the communication modules 216, 218 can be according to any of a variety of communication protocols, e.g., TCP/IP, etc., as will be appreciated by a person skilled in the art.

In some embodiments, the centralized server 140 can provide supervisory control of the dispenser 110. For example, the centralized server 140 can monitor operation of the dispenser 110 by receiving operational information from the dispenser 110 on an ongoing basis. The centralized server 140 can thus track the performance of the dispenser 110, determine whether maintenance is needed, and so on. The centralized server 140 can also be configured to send control commands to the dispenser 110 so as to control operation of the dispenser 110 remotely. However, in other embodiments, the centralized server 140 does not provide supervisory control of the dispenser 110.

The centralized server 140 can be in further communication with vehicle service provider servers 150. The vehicle service provider servers 150 can include a plurality of servers, databases, data stores, etc., each of which can be configured in various ways, such as in accordance with the exemplary computing system of FIG. 6. Each vehicle service provider server 150 can be managed by a vehicle service provider, which can include, for instance, different vehicle OEMs (e.g., Hyundai®, Honda®, BMW®, etc.), service or maintenance stations including repair shops, or any other entity capable of storing information regarding the service history of a vehicle. The service history can encompass, for instance, information regarding past service dates, specific services performed, upcoming service due dates, or any other information relating to the service, maintenance, and/or condition of a vehicle.

In some embodiments, the centralized server 140 can collect service history information for a plurality of vehicles from the vehicle service provider servers 150. The centralized server 140 can then store the collected service history information and, in some cases, provide access to such information to the dispenser 110 via communication links 145, 146. This way, all vehicle service history information from all vehicle service providers can be synced and stored in a centralized location. In one example, with reference to FIG. 1A, which illustrates a "centralized" model, the dispenser 110 can transmit an API call via communication links 145, 146 to the centralized server 140 to fetch the service history information for a vehicle based on vehicular information such as an identified license plate number, VIN, and/or vehicle make/model. A simplified version of the API call sent by the dispenser 110 to the centralized server 140 for illustrative purposes may be as follows:

API request: https://{url}/"vehicleNumber"/"vehicleBrand"

The centralized server 140 can respond to the API call by sending the corresponding service history information, which may in turn be used by the dispenser 110 to automatically suggest and/or book a service appointment for the vehicle, as discussed in further detail below. As such, the centralized server 140 can operate as an intermediary between the dispenser 110 and the vehicle service providers.

In an alternative embodiment, the dispenser 110 can communicate directly with the vehicle service provider servers 150 to collect vehicle service history information directly from the vehicle service providers themselves. With reference to FIG. 1B, which illustrates a "cloud-to-cloud integration" model, the dispenser 110 can be configured to communicate with the vehicle service provider servers 150 via communication links 165, 1610 (e.g., via the wired and/or wireless communication modules 216, 218). Signals can be communicated using suck links via a network 181 (e.g., the public Internet, a virtual private network (VPN), or the like). It is noted that the network 181 can be separate from the network 180 in some embodiments, or the networks can be the same such that communication links 145, 146, 165, 1610 utilize the same network.

According to this configuration, API's can be exposed by each vehicle service provider to the dispenser 110 through cloud-to-cloud integration. The dispenser 110 can thus make the necessary API call to the exact service provider directly (without using the centralized server 140 as an intermediary) based on vehicular information such as an identified license plate number, VIN, and/or vehicle make/model. A simplified version of the API call sent by the dispenser 110 to the vehicle service provider servers 150 for illustrative purposes may be as follows:

API request: https://{url}/"vehicleNumber"/"vehicleBrand"

The one of the vehicle service provider servers among the vehicle service provider servers 150 can respond to the API call by sending the corresponding service history information, which may in turn be used by the dispenser 110 to automatically book a service appointment for the vehicle, as discussed in further detail below.

It is to be appreciated that FIGS. 1A and 1B represent only two possible approaches for collection of vehicle service history information at the dispenser 110 for the purpose of automatically suggesting and/or booking a service appointment for a vehicle. Other embodiments are also envisioned, as would be appreciated by a person of ordinary skill in the art, and these embodiments should not be treated as limiting the scope of the present claims.

Furthermore, the system 100 can also include a vehicle service station 190 that is able to service a vehicle. For example, the vehicle service station 190 can be a dealership, a car repair shop, or any other establishment capable of perform service on a vehicle (e.g., repairs, fluid changes, component replacements, etc.). According to some embodiments, the dispenser 110 can communicate with the vehicle service station 190 via a communication link 175 (e.g., via the wired and/or wireless communication modules 216, 218) over the network 180. These communications can entail sending and receiving messages between the dispenser 110 and the vehicle service station 190 for the purpose of scheduling a vehicle service appointment, as described in greater detail below. The vehicle service station 190 can be equipped with one or more computing devices, configured in accordance with FIG. 6, for example, to receive booking information the dispenser 110 and process the booking information to book a service appointment. It should be appreciated that the vehicle service station 190 may actually include a plurality of vehicle service stations, so that the dispenser 110 is capable of communicating with any number of different vehicle service stations depending on location, user preference, availability, and so on.

Figure 4A:
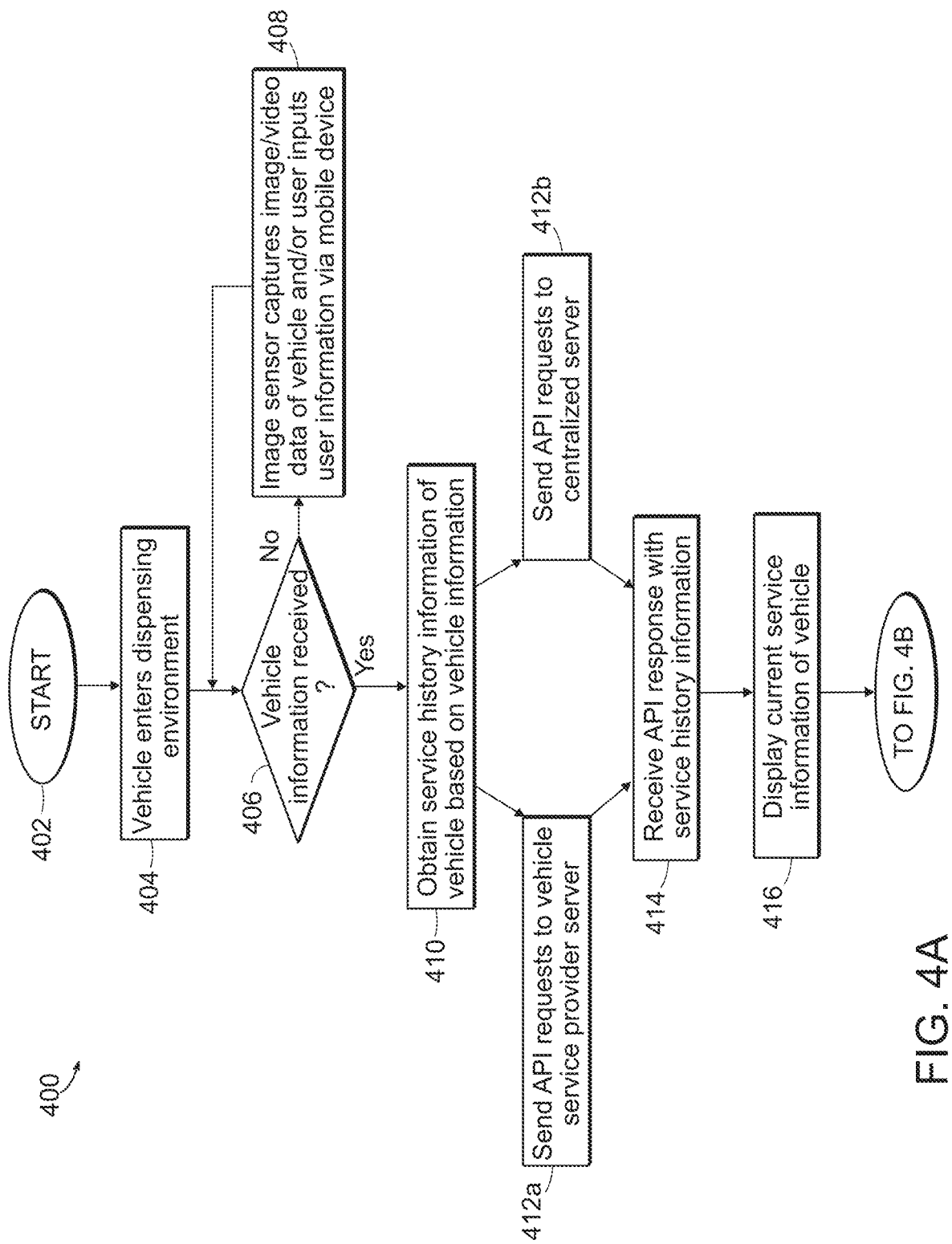
FIGS. 4A and 4B illustrate one implementation of a process for automatic service appointment suggestion and booking through a dispenser.
Figure 4B:
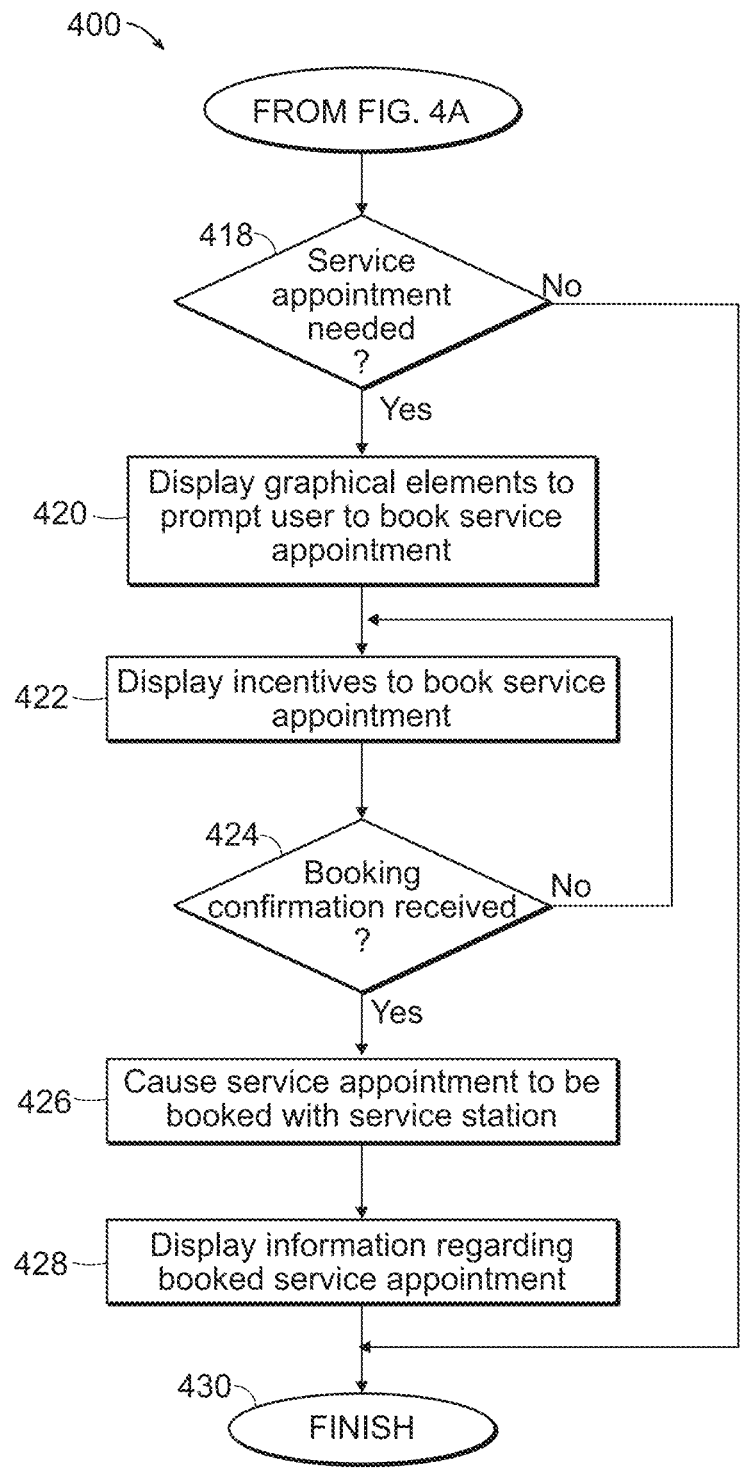

FIGS. 4A and 4B illustrate one implementation of a process 400 for automatic service appointment suggestion and booking through a dispenser, in accordance with one or more embodiments described herein. Unless otherwise noted, steps of the process 400 can be performed by a data processor (e.g., control module 212) of the dispenser 110. The process 400 is described with respect to the system 100 of FIG. 1 for ease of explanation but can be similarly performed with other systems. The process 400 starts at step 402, and continues to step 404, when a vehicle enters a dispensing environment (e.g., a gas station), at step 404. As noted above, dispensing environments include one or more dispensers (e.g., dispenser 110) which can provide fuel, electricity, gas, or similar consumable products or energy-generating materials to vehicles via product dispensers. Often, dispensing environments offer other items or services for purchase, such as food, drinks, vehicle maintenance equipment, vacuum, air, repair services, or car washes.

At step 406, it is determined whether the dispenser 110 has received identifying information of the vehicle after it has entered the dispensing environment. Generally speaking, the identifying information is information that uniquely identifies the vehicle. For example, the identifying information of the vehicle can include one or more of: a license plate number, a vehicle identification number (VIN), and a make and model of the vehicle.

The identifying information of the vehicle can be acquired in various ways. For example, at step 408, the image sensor 120 can capture image or video data of a portion of the vehicle. In some embodiments, the portion of the vehicle captured in image or video data can include a license plate of the vehicle or a unique graphical element (e.g., a barcode, a QR code, or other uniquely identifying image) located on the vehicle.

In some embodiments, the image sensor 120 can send the captured image or video data directly to the dispenser 110 (e.g., via communication link 125), as described above. The dispenser 110 can, in turn, perform an image or video processing algorithm on the received image or video data to generate the identifying information of the vehicle. For example, if the portion of the vehicle captured by the image or video data includes a license plate of the vehicle, the dispenser 110 can perform an image or video processing algorithm to recognize the license plate number of the vehicle. Moreover, if the portion of the vehicle captured by the image or video data includes a unique graphical element (e.g., a barcode, a QR code, or other uniquely identifying image) located on the vehicle, the dispenser 110 can perform an image or video processing algorithm to recognize the unique graphical element, which may be linked to a VIN of the vehicle, for instance. Specific aspects of the image or video processing algorithm are generally known in the art and beyond the scope of the present disclosure.

In other embodiments, image or video processing can be performed on the captured image or video data of the vehicle by a computing device (not shown) at a remote location, e.g., a cloud-based server. For example, the dispenser 110 can send the image or video data to the remote location for processing, or the image sensor 120 can send the image or video data to the remote location for processing, allowing the image or video processing algorithm to be performed on the captured image or video data remotely. Upon generating the identifying information of the vehicle, the remote computing device can then send the identifying information of the vehicle to the dispenser 110. Transferring the image/video processing to a remote location may be preferable for the purpose of preserving computing resources of the dispenser 110, as image/video processing is typically resource intensive.

Additionally, the identifying information of the vehicle can be generated by the dispenser 110 based on user information (e.g., a user ID number, mobile device number, email address, account name, or the like) received from a mobile device (e.g., mobile device 130). As described above, a user can have previously registered an account with a remote server (e.g., centralized server 140) that provides supervisory control of the dispenser 110 and/or installed an application (e.g., downloaded from the server 140, an application store, or some other source) on the mobile device 130 associated with the dispenser 110. The user can then provide the user information, optionally after performing various authentication/verification procedures, which may be linked to information about the user's vehicle. The user information which has been previously associated with the vehicle information can be used in addition to, or instead of, the image or video data of the vehicle captured by the image sensor 120

After successfully determining the identifying information of the vehicle, the dispenser 110 can use the identifying information of the vehicle (e.g., license plate number, VIN, make/model, etc.) to obtain service history information of the vehicle from a remote entity, at step 410. As noted above, the service history information can be obtained in various ways.

In one embodiment, the dispenser 110 can send one or more API requests to one of the vehicle service provider servers 150 managed by a vehicle service provider associated with the vehicle, at step 412*a*. The API requests can include the identifying information of the vehicle. The vehicle service provider server can be configured to store the service history information of the vehicle, and the one or more API requests can be sent directly from the dispenser 110 to the vehicle service provider server 150 (e.g., via communication links 165, 166). In return, the vehicle service provider server 150 can use the identifying information to retrieve service history information of the vehicle and send an API response to the dispenser 110 including the service history information of the vehicle, at step 414.

In another embodiment, the dispenser 110 can send one or more API requests to the centralized server 140, at step 412*b*, which acts as an intermediary between the dispenser 110 and the vehicle service provider servers 150. As noted above, the centralized server 140 can collect service history information for a plurality of vehicles from the vehicle service provider servers 150. The centralized server 140 can then store the collected service history information and provide access to such information to the dispenser 110 (e.g., via communication links 145, 146). As such, the dispenser 110 can send the API requests including the identifying information of the vehicle to the centralized server 140. In return, the centralized server 140 can use the identifying information to retrieve service history information of the vehicle and send an API response to the dispenser 110 including the service history information of the vehicle, at step 414.

After obtaining the service history information of the vehicle, the dispenser 110 can display (e.g., via interactive display 220) current service information of the vehicle, at step 416. The current service information can be generated based upon the service history information and can include, for example, a due date for a next service appointment, a date of a previous service appointment, a current condition of the vehicle or one or more components of thereof, a notification that service is needed, and so on.

Figure 5:
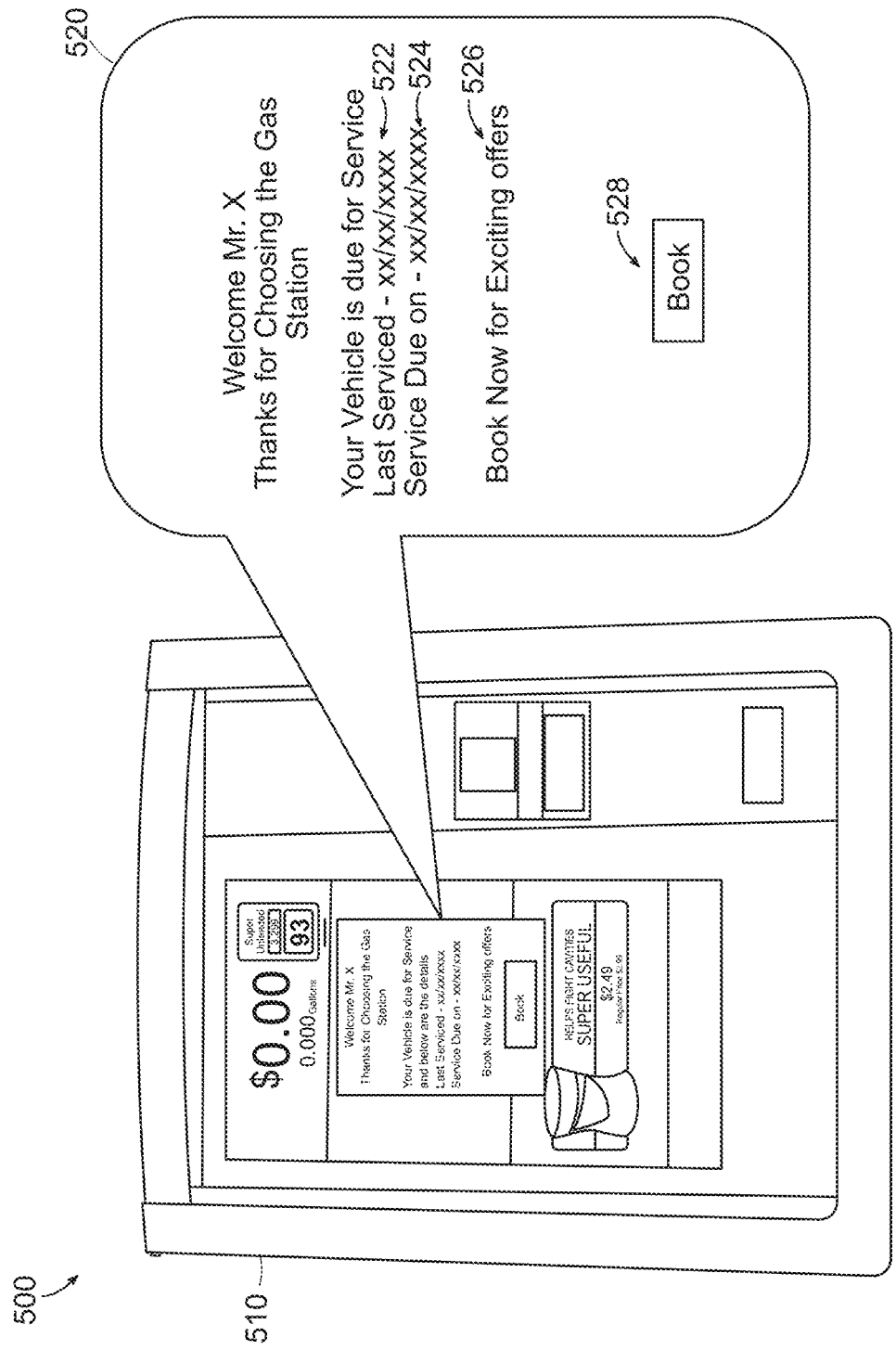
FIG. 5 shows one implementation of a display screen of the dispenser of FIGS. 1A and 1B presenting an automatic service appointment suggestion.

For example, FIG. 5 shows one implementation 500 of a display screen of the dispenser 110 presenting an automatic service appointment suggestion. As shown, the dispenser 110 includes an electronics compartment 510 (e.g., electronics compartment 202) including a display screen, as well as any other number of components such payment processing modules, as described above with respect to FIGS. 2A and 2B. The display screen is showing current service information 520 including, for instance, a last date of service 522 and a service due date 524. Other information, such as a current condition of the vehicle or one or more components thereof, can also be displayed. The display screen can also provide one or more first interactive graphics for booking a vehicle service appointment, such as a button 528 enabling the user to book a service appointment directly through the dispenser 110 (e.g., by pressing the button 528 on a touchscreen display), at step 420. Any number or type of interactive graphics are also envisioned herein, such as icons, images, videos, or the like, which can be displayed by the display of the dispenser 110 and configured to allow for interactivity with the user. Furthermore, the display screen of the dispenser 110 can also display an indication of one or more incentives 526 to book the vehicle service appointment, at step 422. For instance, the one or more incentives can include an offer or a discount associated with the dispensing environment, thus incentivizing the user to book a service appointment directly through the dispenser 110. It should be noted that the specific service history information displayed by the dispenser 110, and the format thereof, can be modified in any suitable manner and is not limited by the implementation 500 illustrated in FIG. 5.

In some cases, the one or more first interactive graphics for booking the vehicle service appointment (e.g., button 528) may only be displayed if the dispenser 110 determines that a service appointment is actually needed based on the service history information of the vehicle, at step 418. If the vehicle does not need a service appointment, the process 400 can simply proceed to finish at step 430. In other cases, the one or more first interactive graphics for booking the vehicle service appointment can be displayed by the dispenser 110 regardless of whether or not a service appointment is determined to be needed.

If booking confirmation is received (e.g., via the one or more first interactive graphics 528), at step 424, the dispenser 110 can proceed to cause a service appointment to be booked with a service station, at step 426. In this regard, upon receiving an indication that the user wishes to book a service appointment, such as by selecting the booking button 528, the dispenser 110 can initiate a communication session with the vehicle service station 190 via the communication link 175.

In some embodiments, the user can provide preferences or parameters via the interactive display of the dispenser 110 for scheduling the service appointment, herein referred to as "user-specified booking information." For example, the dispenser 110 can provide one or more first interactive graphics (see FIG. 5) enabling a user to specify booking information such as a date of the vehicle service appointment, a time of the vehicle service appointment, a location of the vehicle service appointment, a type of the vehicle service appointment, and any other information that can be used for the purpose of scheduling a vehicle service appointment. The dispenser 110 can then use the user-specified booking information to select an optimal vehicle service station among various different possible service stations (e.g., according to the user's specified date, time, location, etc.). The dispenser 110 can then initiate communication with the optimal vehicle service station via the communication link 175 ("second communication link") to schedule or book the vehicle service appointment. As a result, the user is able to schedule a service appointment for his or her vehicle simply through interaction with the dispenser 110, during a typical fueling session, without having to manually search for or call different service stations, thus enhancing the efficiency of scheduling a vehicle service appointment.

After the service appointment has been booked, the dispenser 110 can display information regarding the booked vehicle service appointment, such as the date/time of the appointment, the location of the appointment, the specific services to be performed, and so on, at step 428. This way, details of the appointment booking can be provided to the user for confirmation.

The process 400 then ends at step 430. It should be noted that while certain steps within the process 400 may be optional as described above, the steps shown in FIGS. 4A and 4B are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The process 400 can include additional steps, as well. For example, in some embodiments, the user's fueling session can be made more efficient by tracking the fueling history of the vehicle. To this end, upon identification of an incoming vehicle (e.g., steps 406 and 408), the dispenser 110 can use the identifying information of the vehicle to obtain the vehicle's fueling history information. This information can include one or more characteristics from a previous fueling session of the vehicle including, for example, a grade of fuel, a quantity of fuel, a pump used to deliver fuel, and so on. Based on this information, the dispenser 110 can then generate a fueling suggestion for the vehicle and can display the generated fueling suggestion via the display 220. As an example, assume a user drives into the dispensing environment, and the dispenser 110 obtains the fueling history information corresponding to the user's vehicle indicating that premium grade fuel is selected 25% of the time, and the user has selected unleaded grade fuel on three previous consecutive occasions. For this visit the dispenser 110 can suggest that the user refuel the vehicle using premium grade fuel to maintain consistency with the vehicle's fueling history. Moreover, the dispenser 110 can display one or more second interactive graphics, similar to the graphics shown in FIG. 5, for the purpose of automatically initiating a fueling session according to the generated fueling suggestion. Following the above example, the user can select the interactive graphical element shown on the display of the dispenser 110, and the dispenser 110 can automatically initiate a fueling session using premium grade fuel as suggested.

Figure 6:
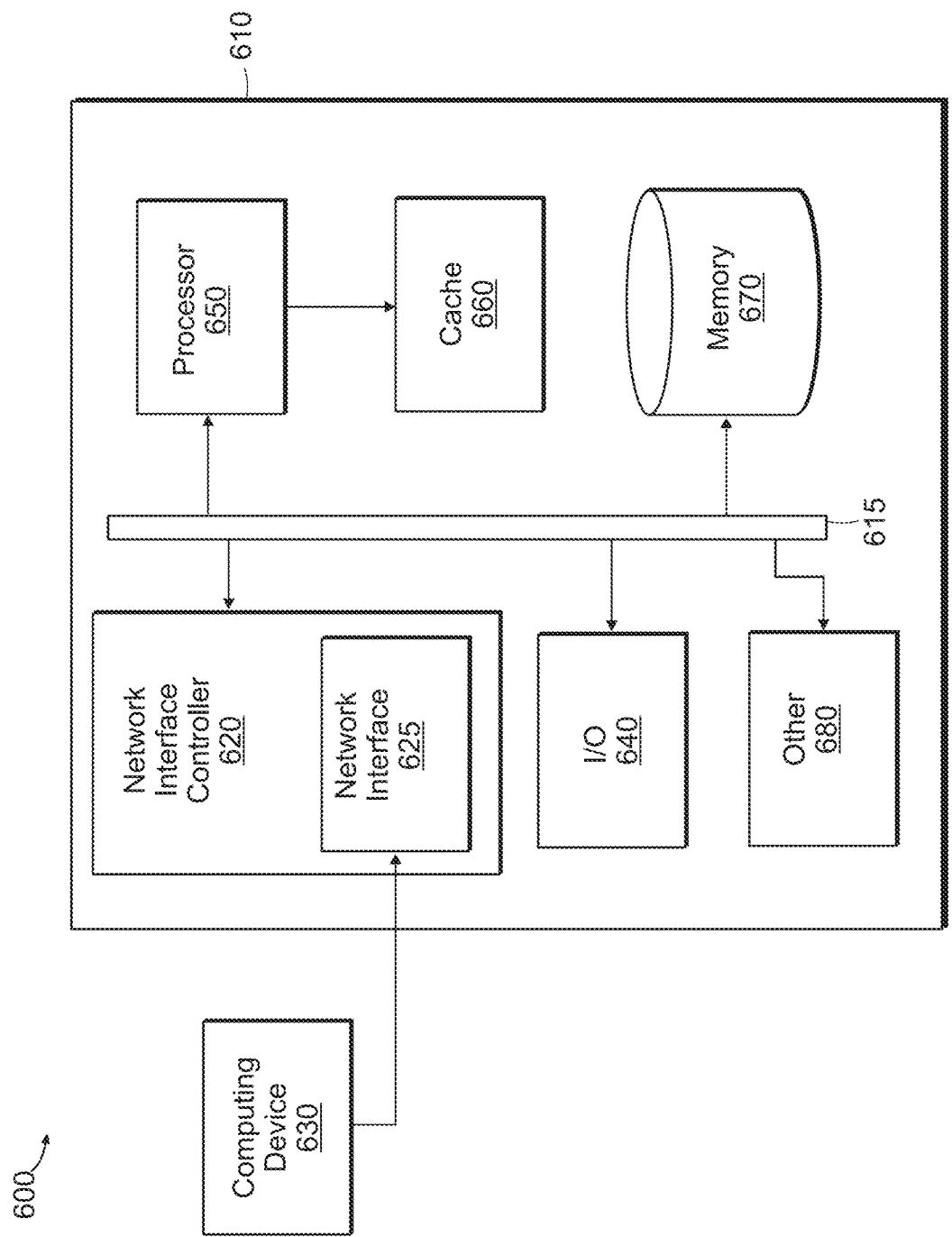
FIG. 6 is a diagram of an exemplary computing system in accordance with an illustrative implementation of the system of FIGS. 1A and 1B.

FIG. 6 is a block diagram 600 of a computing system 610 suitable for use in implementing the computerized components described herein, such as a computing device configured within the dispenser 110, centralized server 140, vehicle service provider servers 150, and/or vehicle service station 190. In broad overview, the computing system 610 includes at least one processor 650 for performing actions in accordance with instructions, and one or more memory devices 660 and/or 670 for storing instructions and data. The illustrated example computing system 610 includes one or more processors 650 in communication, via a bus 615, with memory 670 and with at least one network interface controller 620 with a network interface 625 for connecting to external devices 630, e.g., another computing device as described herein. The one or more processors 650 are also in communication, via the bus 615, with each other and with any I/O devices at one or more I/O interfaces 640, and any other devices 680. The processor 650 illustrated incorporates, or is directly connected to, cache memory 660. Generally, a processor will execute instructions received from memory. In some embodiments, the computing system 610 can be configured within a cloud computing environment, a virtual or containerized computing environment, and/or a web-based microservices environment.

In more detail, the processor 650 can be any logic circuitry that processes instructions, e.g., instructions fetched from the memory 670 or cache 660. In many embodiments, the processor 650 is an embedded processor, a microprocessor unit or special purpose processor. The computing system 610 can be based on any processor, e.g., suitable digital signal processor (DSP), or set of processors, capable of operating as described herein. In some embodiments, the processor 650 can be a single core or multi-core processor. In some embodiments, the processor 650 can be composed of multiple processors.

The memory 670 can be any device suitable for storing computer readable data. The memory 670 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 610 can have any number of memory devices 670.

The cache memory 660 is generally a form of high-speed computer memory placed in close proximity to the processor 650 for fast read/write times. In some implementations, the cache memory 660 is part of, or on the same chip as, the processor 650.

The network interface controller 620 manages data exchanges via the network interface 625. The network interface controller 620 handles the physical, media access control, and data link layers of the Open Systems Interconnect (OSI) model for network communication. In some implementations, some of the network interface controller's tasks are handled by the processor 650. In some implementations, the network interface controller 620 is part of the processor 650. In some implementations, a computing device 610 has multiple network interface controllers 620. In some implementations, the network interface 625 is a connection point for a physical network link, e.g., an RJ 45 connector. In some implementations, the network interface controller 620 supports wireless network connections and an interface port 625 is a wireless Bluetooth transceiver. Generally, a computing device 610 exchanges data with other network devices 630, such as computing device 630, via physical or wireless links to a network interface 625. In some implementations, the network interface controller 620 implements a network protocol such as LTE, TCP/IP Ethernet, IEEE 802.11, IEEE 802.16, Bluetooth, or the like.

The other computing devices 630 are connected to the computing device 610 via a network interface port 625. The other computing device 630 can be a peer computing device, a network device, a server, or any other computing device with network functionality. For example, a computing device 630 can be a computing device associated with a computing device configured within the dispenser 110, centralized server 140, vehicle service provider servers 150, and/or vehicle service station 190. In some embodiments, the computing device 630 can be a network device such as a hub, a bridge, a switch, or a router, connecting the computing device 610 to a data network such as the Internet.

In some uses, the I/O interface 640 supports an input device and/or an output device (not shown). In some uses, the input device and the output device are integrated into the same hardware, e.g., as in a touch screen. In some uses, such as in a server context, there is no I/O interface 640 or the I/O interface 640 is not used. In some uses, additional other components 680 are in communication with the computer system 610, e.g., external devices connected via a universal serial bus (USB).

The other devices 680 can include an I/O interface 640, external serial device ports, and any additional co-processors. For example, a computing system 610 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 610, e.g., a touch screen on a tablet device. In some implementations, a computing device 610 includes an additional device 680 such as a co-processor, e.g., a math co-processor that can assist the processor 650 with high precision or complex calculations.

Figure 7:
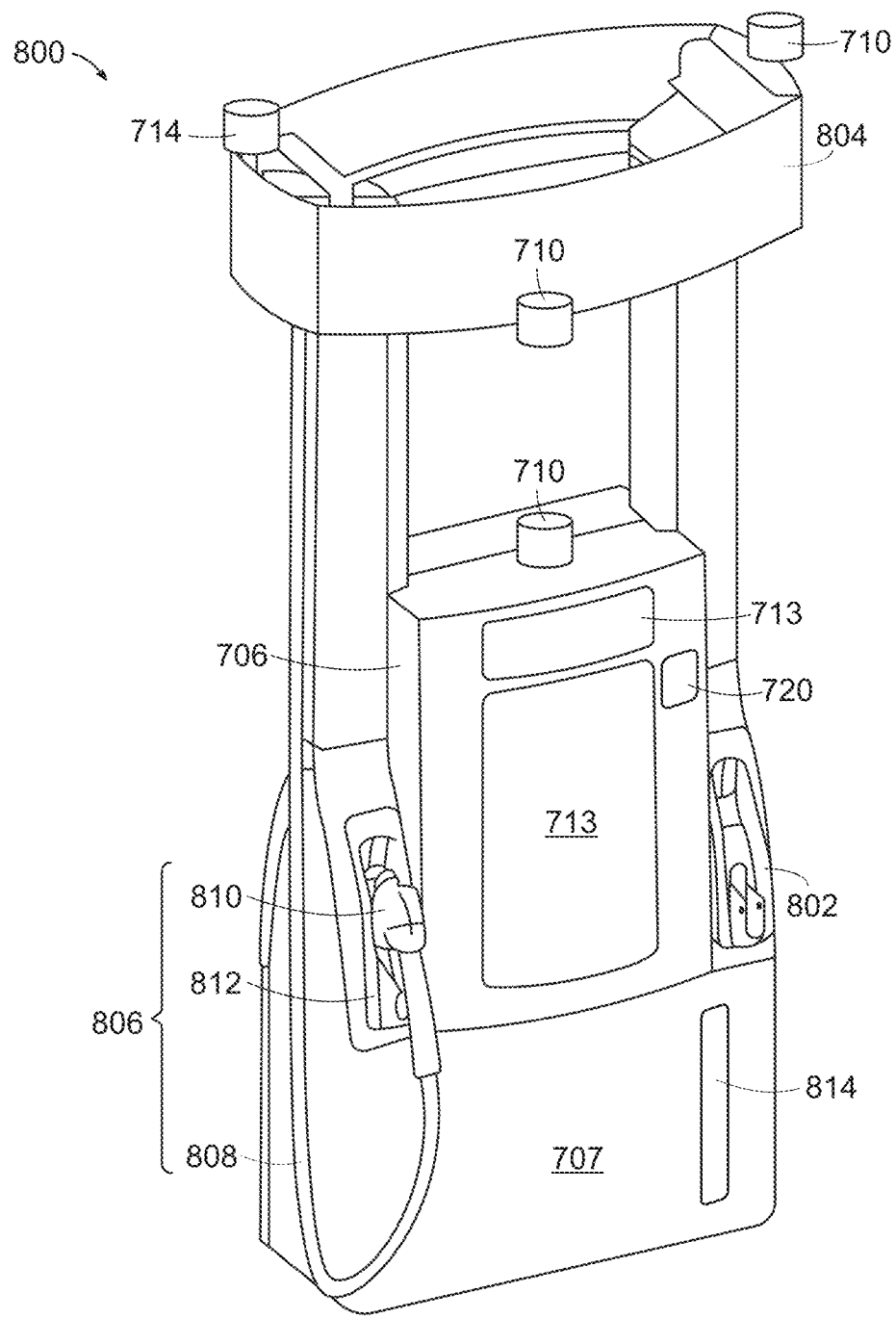
FIG. 7 is a diagram illustrating a perspective view of an embodiment of the dispenser of FIGS. 1A and 1B configured to dispense a liquid product.

FIG. 7 illustrates a perspective view of one embodiment of a dispenser 800. The dispenser 800 is an embodiment of the dispenser 110 as described hereinabove. The dispenser 800 can be configured to dispense liquid products (e.g., petroleum fuel). For example, in some embodiments, the dispenser 800 can be configured to dispense liquid products such as gasoline, diesel fuel, ethanol-based fuels, biofuels, diesel exhaust fluid (DEF), fuel additives (e.g., acetone, ether, nitrous oxide, nitromethane, butyl rubber, ferox, oxyhydrogen), water and the like.

As shown in FIG. 7, the dispenser 800 can include a dispenser body 802 in which the electronics compartment 706 and the pump compartment 707 are configured. The dispenser 800 can also include a dispenser awning 804 coupled to the dispenser body 802. In some embodiments, the dispenser body 802 can include the dispenser awning 804. In some embodiments, the dispenser body 802 can exclude the dispenser awning 804. The dispenser awning 804 can include at least one image sensor 710 and at least one wireless transmission module 714 configured thereon. In some embodiments, the dispenser body 802 can, additionally or alternatively, include an image sensor 710. As further shown, the dispenser body 802 can include a display 713, a payment mechanism 720, and a dispensing assembly 806.

The dispenser body 802 can include an electronics compartment 706 and a pump compartment 707. The pump compartment 707 is isolated from the electronics compartment 706 within the dispenser 800 to facilitate safety, security, and/or maintenance, as will be appreciated by a person skilled in the art. Dispensed products or fuel is thus not allowed to flow from the pump compartment 707 to the electronics compartment 706 and instead flows from the pump compartment 707 to the dispensing assembly 806. The dispensing assembly 806 can include a hose 808 coupled to a nozzle 810 for dispensing the liquid product. As will be appreciated by a person skilled in the art, the nozzle 810 can be configured to dispense the liquid product from the dispenser 800 as pumped therefrom by the pump 708. The dispensing assembly 806 can also include a nozzle receptacle 812 configured to store the nozzle 810 when not in use. In some embodiments, the dispenser 800 can include 1, 2, 3, 4, 5, or 6 dispensing assemblies 806. In some embodiments, one or more first dispensing assemblies 806 can be provided on a first side of the dispenser 800 and one or more second dispensing assemblies 806 can be provided on a second side of the dispenser 800 that is opposite the first side of the dispenser 800.

In some embodiments, the dispenser 800 can be configured to dispense diesel exhaust fluid (DEF) and can include a heater 814 within the pump compartment 707 of the dispenser body 802. The heater 814 can be configured to heat the DEF and portions of the pump compartment 707 and/or dispensing assemblies 806. Heating components of the dispenser 800 can be advantageous in climates where freezing temperatures are a concern.

In some implementations, the dispensers described herein can be configured to other types of dispensed products, in addition to or instead of a liquid dispensed product. For example, the dispenser can be configured to dispense products in a gaseous format, such as hydrogen, compressed natural gas (CNG), liquified natural gas (LNG), electricity, or the like. It will be understood that the dispensing environments, dispensing systems, and the dispensers described herein are not limited to dispensing products in liquid format and that the dispensing environments, dispensing systems, and the dispensers described herein can, additionally or alternatively, be configured to dispense products in non-liquid product formats, such as a vapor, a gas, or electricity. For example, in some implementations, the dispenser 800 can be a hydrogen dispenser. As another example, in some implementations, the dispenser 800 can be a compressed natural gas dispenser. As yet another example, in some implementations, the dispenser 800 can be an electrical fuel dispenser configured to dispense electricity.

Figure 8:
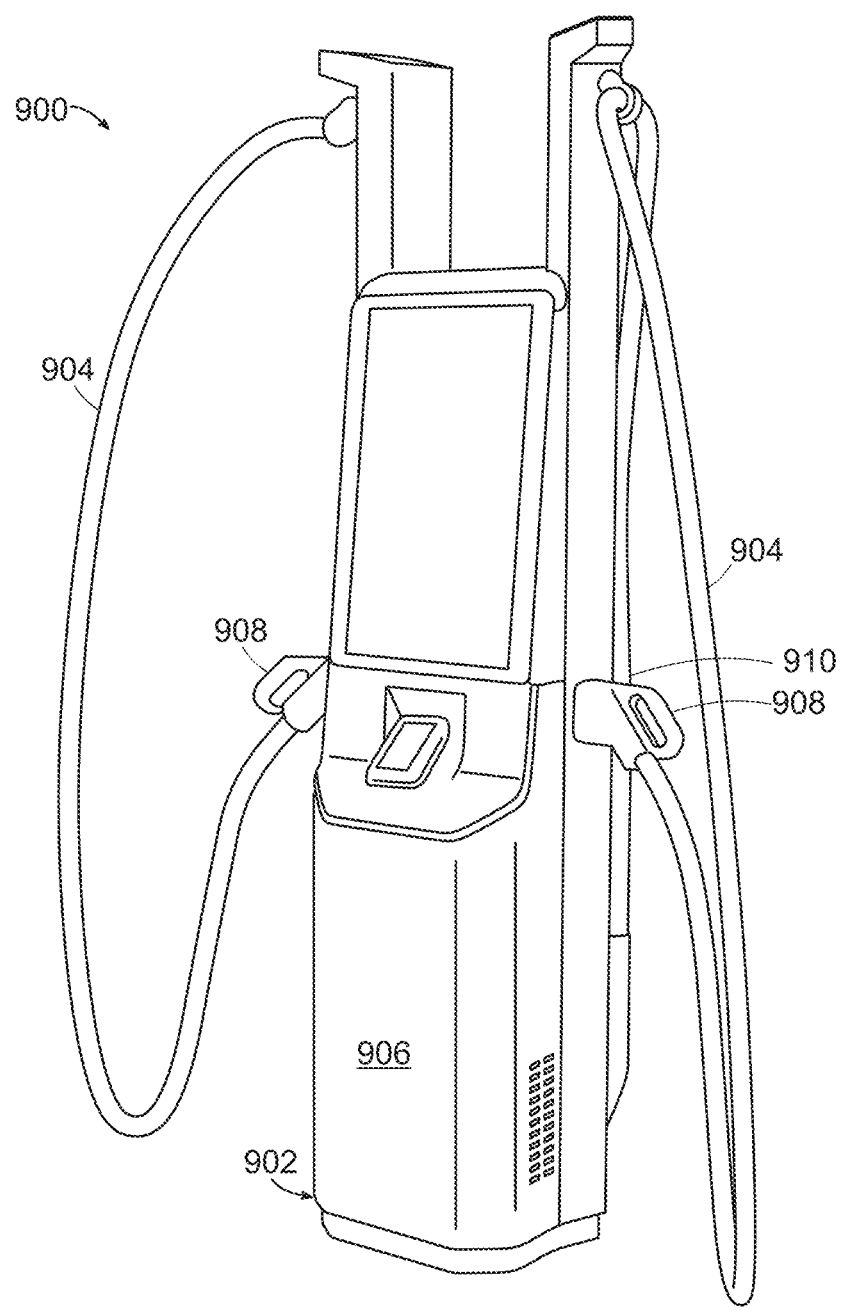
FIG. 8 is a side perspective view of an embodiment of the dispenser of FIGS. 1A and 1B configured to dispense electricity.

The dispenser 900 of FIG. 8 is another embodiment of the dispenser 110 and 800 except where noted otherwise. The dispenser 900 can be configured to dispense electricity. For example, the dispenser 900 can be configured as an electric vehicle charger. The dispenser 900 can be operatively coupled to a power supply 902, such as a local or regional power grid, a battery-back up power supply, a retail sales facility, or a vehicle service facility located in proximity of the dispenser 900.

The dispenser 900 can include a charging cable 904 coupled to a dispenser body 906 of the dispenser 900. In some embodiments, the dispenser 900 can include multiple charging cables 904 as shown in FIG. 8 and is not limited to a configuration having a single charging cable 904. The charging cable 904 can be configured to deliver electricity to a charging connector 908. The charging connector 908 can be configured to couple to a charging port of a vehicle and to deliver the electricity provided by the dispenser 900, via the charging cable 904, to the vehicle when the charging connector 908 is coupled to the vehicle charging port. When not in use, the charging connector 908 is configured to be stored in a charger receptacle 910 formed on the dispenser body 906.

Figure 9:
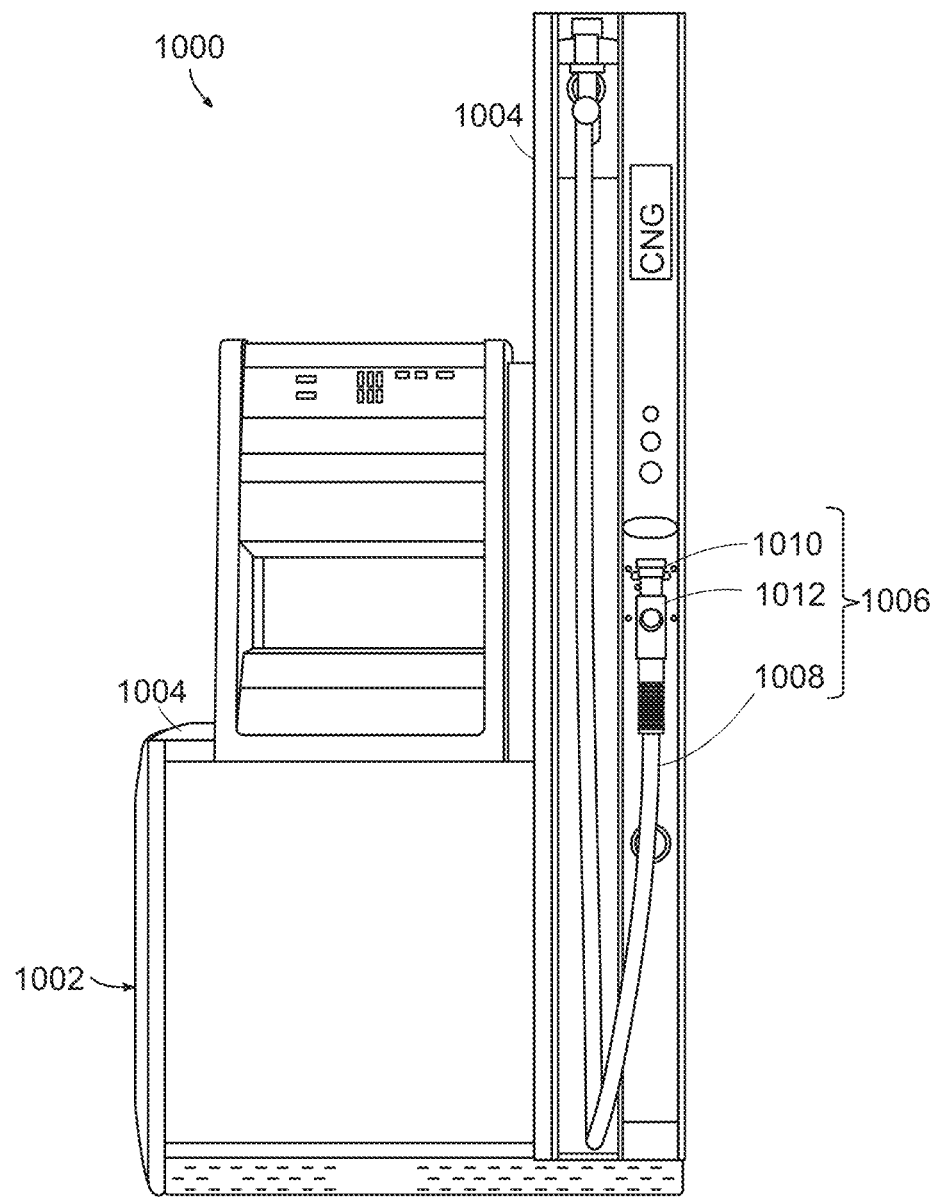
FIG. 9 is a front perspective view of an embodiment of the dispenser of FIGS. 1A and 1B configured to dispense a gaseous product.

The dispenser 1000 shown in FIG. 9 is another embodiment of the dispenser 110 and 800 except where noted otherwise. The dispenser 1000 can be configured to dispense gaseous products such as compressed natural gas (CNG). In some embodiments, the dispenser 1000 can alternatively be configured to dispense, liquified petroleum gas (LPG), hydrogen, and liquified natural gas (LNG). For example, the dispenser 1000 can be operatively coupled to a gas supply 1002 of CNG or other gaseous product, such as a local or regional pipeline, a stored gas supply located within the dispensing environment with the dispenser 1000, or a mobile tube trailer in proximity of the dispenser 1000.

The dispenser 1000 can also include one or more dispensing assemblies 1006 configured within the dispenser body 1004. The dispensing assembly 1006 can include a hose 1008 coupled to a nozzle 1010 for dispensing the gaseous CNG product. As will be appreciated by a person skilled in the art, the nozzle 1010 can be configured to dispense the CNG product from the dispenser 1000. The dispensing assembly 1006 can also include a nozzle receptacle 1012 configured to store the nozzle 1010 when not in use. In some embodiments, the dispenser 1000 can include 1, 2, 3, 4, 5, or 6 dispensing assemblies 1006. In some embodiments, one or more first dispensing assemblies 1006 can be provided on a first side of the dispenser 1000 and one or more second dispensing assemblies 1006 can be provided on a second side of the dispenser 1000 that is opposite the first side of the dispenser 1000.

In some embodiments, the dispensers described herein can be configured to dispense multiple product types. For example, a first portion of a dispenser including a first dispensing assembly can be configured to dispense a liquid product, such as petroleum or DEF, and a second portion of the same dispenser can include a second dispensing assembly configured to dispense a non-liquid product, such as electricity or a gaseous product, such as CNG, LNG, LPG, or Hydrogen. A variety of combinations of dispensing portions and assemblies necessary to dispense multiple, different dispensed products can be envisioned within a single dispenser body of a dispenser as described herein.

The techniques described herein, therefore, allow for automatically suggesting and booking a vehicle service appointment for a user during a refueling session in a dispensing environment. By enabling a user to book a service appointment via a dispenser being used to refuel the user's vehicle, the user can quickly and conveniently book a service appointment without having to manually search for a nearby vehicle service station with availability corresponding to the user's schedule. Moreover, the disclosed techniques provide incentives in the form of discounts or other offers redeemable in the dispensing environment to incentivize the user to book a service appointment through the dispenser, thereby increasing sales for both the dispensing environment and the service station.

One skilled in the art will appreciate further features and advantages of the devices, systems, and methods based on the above-described embodiments. Accordingly, this disclosure is not to be limited by what has been particularly shown and described, except as indicated by the appended claims. All publications and references cited herein are expressly incorporated herein by reference in their entirety for all purposes.

Those skilled in the art will understand that the systems, devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The present disclosure has been described above by way of example only within the context of the overall disclosure provided herein. It will be appreciated that modifications within the spirit and scope of the claims may be made without departing from the overall scope of the present disclosure.

What is claimed is:

1. A method comprising:
   determining, by a data processor of a dispenser within a dispensing environment, identifying information of a vehicle present within the dispensing environment based on image or video data of a portion of the vehicle located on an exterior of the vehicle captured by an image sensor within the dispensing environment, the image sensor being communicatively coupled to the dispenser;
   obtaining, via a first communication link between the dispenser and a remote entity, service history information of the vehicle from the remote entity using the identifying information of the vehicle, wherein the remote entity is a vehicle service provider server managed by a vehicle service provider associated with the vehicle, the vehicle service provider server being configured to store the service history information;
   displaying, by a display screen of the dispenser and based on the service history information of the vehicle, current service information, one or more first interactive graphics for booking a vehicle service appointment, and one or more second interactive graphics for initiating a fueling session, the display screen being configured to receive user input via the one or more first interactive graphics and the one or more second interactive graphics;
   causing, via a second communication link between the dispenser and a vehicle service station, the vehicle service appointment to be booked with the vehicle service station in response to receiving a booking confirmation via the one or more first interactive graphics; and
   initiating, by the data processor of the dispenser, the fueling session in response to activation of the one or more second interactive graphics such that fuel is dispensed to the vehicle,
   wherein obtaining the service history information comprises:
      sending, by the dispenser and via the first communication link, one or more application programming interface (API) requests to the vehicle service provider server for the service history information of the vehicle using the identifying information of the vehicle; and
      receiving, by the dispenser and via the first communication link, the service history information of the vehicle in response to the one or more API requests.

2. The method of claim 1, wherein the current service information displayed by the display of the dispenser comprises one or more of: a due date for a next service appointment, a date of a previous service appointment, a current condition of the vehicle or one or more components of thereof, and a notification that service is needed.

3. The method of claim 1, further comprising:
   determining, by the data processor of the dispenser, whether the vehicle service appointment is required based on the service history information of the vehicle, wherein the one or more first interactive graphics for booking the vehicle service appointment are displayed only if the data processor of the dispenser determines that the vehicle service appointment is required.

4. The method of claim 1, wherein the identifying information of the vehicle comprises one or more of: a license plate number, a vehicle identification number (VIN), and a make and model of the vehicle.

5. The method of claim 1, wherein the portion of the vehicle comprises a license plate of the vehicle or a unique graphical element located on the exterior of the vehicle.

6. The method of claim 1, wherein the determining of the identifying information of the vehicle comprises:
   performing, by the data processor of the dispenser, an image or video processing algorithm on the image or video data of the portion of the vehicle to generate the identifying information of the vehicle.

7. The method of claim 6, wherein the portion of the vehicle comprises a license plate of the vehicle, the identifying information of the vehicle comprises a license plate number, and the image or video processing algorithm is configured to recognize the license plate number.

8. The method of claim 6, wherein the portion of the vehicle comprises a unique graphical element located on the exterior of the vehicle, the identifying information of the vehicle comprises a VIN linked to the unique graphical element, and the image or video processing algorithm is configured to recognize the unique graphical element.

9. The method of claim 1, wherein the determining of the identifying information of the vehicle comprises:
   receiving, by the dispenser, the identifying information of the vehicle from a remote location having generated the identifying information of the vehicle using the image or video data of the portion of the vehicle.

10. The method of claim 1, wherein the determining of the identifying information of the vehicle comprises:
    receiving, by the data processor of the dispenser, user information from a mobile device in communication with the dispenser; and
    determining, by the data processor of the dispenser, the identifying information of the vehicle based on the user information, the identifying information of the vehicle being associated with the user information.

11. The method of claim 1, wherein the causing of the vehicle service appointment to be booked with the vehicle service station comprises:
    receiving, by the data processor of the dispenser and via the one or more first interactive graphics, user-specified booking information including an indication of one or more of: a date of the vehicle service appointment, a time of the vehicle service appointment, a location of the vehicle service appointment, and a type of the vehicle service appointment; and causing, via the second communication link, the vehicle service appointment to be booked with the vehicle service station using the user-specified booking information.

12. The method of claim 11, further comprising:
    displaying, by the display of the dispenser, information regarding the booked vehicle service appointment.

13. The method of claim 1, further comprising:
    displaying, via the display of the dispenser, an indication of one or more incentives to book the vehicle service appointment, the one or more incentives comprising an offer or a discount associated with the dispensing environment.

14. The method of claim 1, further comprising:
obtaining, by the data processor of the dispenser, fueling history information of the vehicle using the identifying information of the vehicle, the fueling history information indicative of one or more characteristics from a previous fueling session including a grade of fuel, a quantity of fuel, or a pump used to deliver fuel;
generating, by the data processor of the dispenser, a fueling suggestion for the vehicle based on the fueling history information; and
displaying, by the display of the dispenser, an indication of the generated fueling suggestion.

15. The method of claim 14, wherein the initiating of the fueling session in response to activation of the one or more second interactive graphics comprises:
initiating, by the data processor of the dispenser, the fueling session according to the generated fueling suggestion.

16. A dispenser comprising:
one or more network interfaces configured to send and receive information via a communication link;
a display screen configured to receive user input via one or more first interactive graphics and one or more second interactive graphics;
at least one data processor configured to perform one or more operations; and
a memory configured to store program instructions executable by the at least one data processor,
wherein the program instructions, when executed, cause the at least one data processor to perform operations comprising:
determining identifying information of a vehicle present within a dispensing environment based on image or video data of a portion of the vehicle located on an exterior of the vehicle captured by an image sensor within the dispensing environment, the image sensor being communicatively coupled to the dispenser;
obtaining, via a first communication link between the dispenser and a remote entity, service history information of the vehicle from the remote entity using the identifying information of the vehicle, wherein the remote entity is a vehicle service provider server managed by a vehicle service provider associated with the vehicle, the vehicle service provider server being configured to store the service history information;
displaying, by the display screen and based on the service history information of the vehicle, current service information, the one or more first interactive graphics for booking a vehicle service appointment, and the one or more second interactive graphics for initiating a fueling session;
causing, via a second communication link between the dispenser and a vehicle service station, the vehicle service appointment to be booked with the vehicle service station in response to receiving a booking confirmation via the one or more first interactive graphics; and
initiating the fueling session in response to activation of the one or more second interactive graphics such that fuel is dispensed to the vehicle,
wherein the dispenser obtains the service history information by:
sending, via the first communication link, one or more application programming interface (API) requests to the vehicle service provider server for the service history information of the vehicle using the identifying information of the vehicle; and
receiving, via the first communication link, the service history information of the vehicle in response to the one or more API requests.

17. A system comprising:
an image sensor provided within a dispensing environment; and a dispenser provided within the dispensing environment and communicatively coupled to the image sensor, the dispenser comprising one or more network interfaces configured to send and receive information via a communication link, a display screen configured to receive user input via one or more first interactive graphics and one or more second interactive graphics, at least one data processor configured to perform one or more operations, and a memory configured to store program instructions executable by the at least one data processor,
wherein the image sensor is configured to capture image or video data of a portion of a vehicle located on an exterior of the vehicle present within the dispensing environment, and
wherein the at least one data processor is configured to:
determine identifying information of the vehicle based on the image or video data;
obtain, via a first communication link between the dispenser and a remote entity, service history information of the vehicle from the remote entity using the identifying information of the vehicle, wherein the remote entity is a vehicle service provider server managed by a vehicle service provider associated with the vehicle, the vehicle service provider server being configured to store the service history information;
display, by the display screen and based on the service history information of the vehicle, current service information, the one or more first interactive graphics for booking a vehicle service appointment, and the one or more second interactive graphics for initiating a fueling session;
cause, via a second communication link between the dispenser and a vehicle service station, the vehicle service appointment to be booked with the vehicle service station in response to receiving a booking confirmation via the one or more first interactive graphics; and
initiate the fueling session in response to activation of the one or more second interactive graphics such that fuel is dispensed to the vehicle,
wherein the at least one data processor is further configured to:
send, via the first communication link, one or more application programming interface (API) requests to the vehicle service provider server for the service history information of the vehicle using the identifying information of the vehicle; and
receive, via the first communication link, the service history information of the vehicle in response to the one or more API requests.

* * * * *